UNITED STATES PATENT OFFICE.

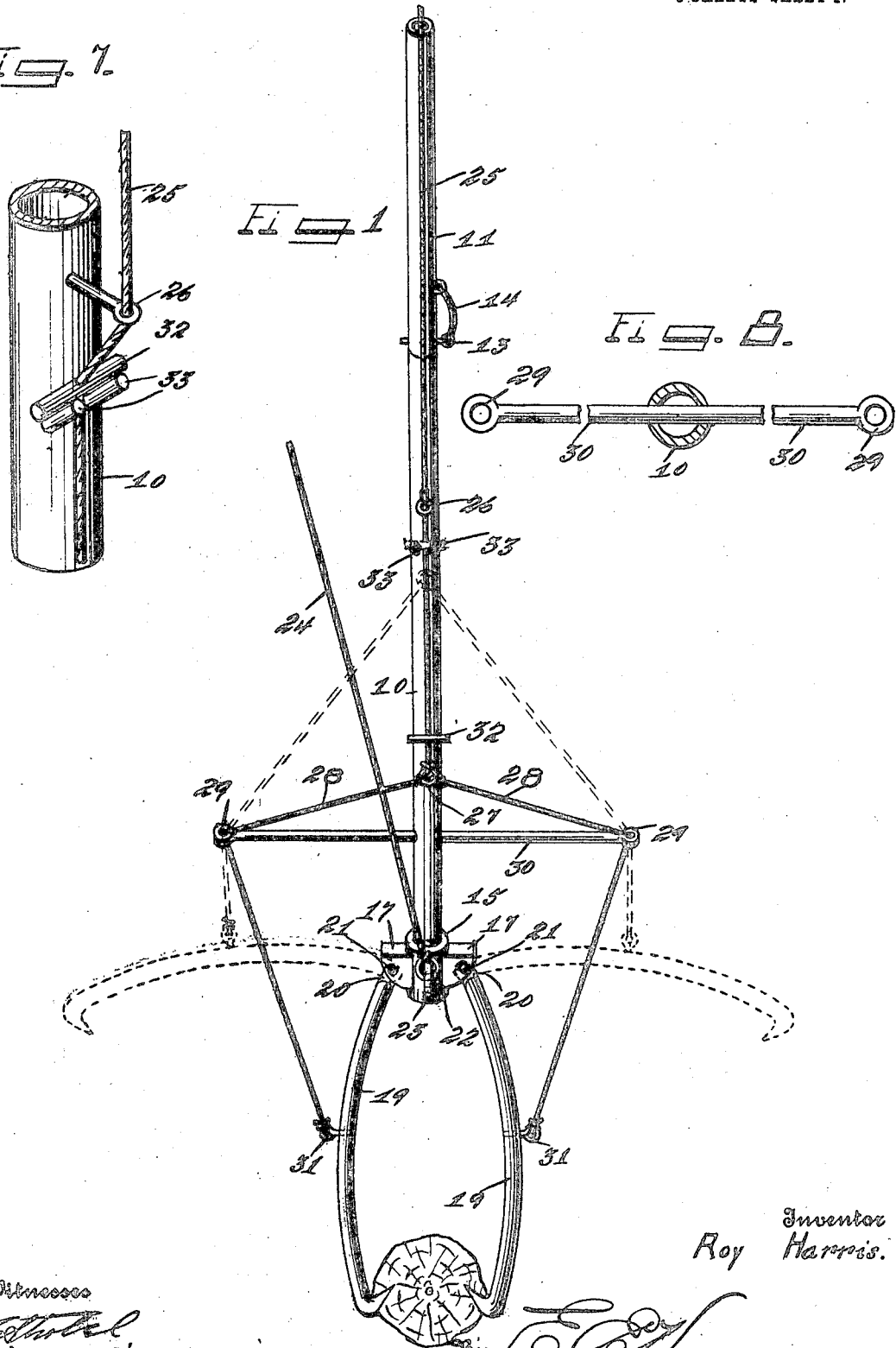

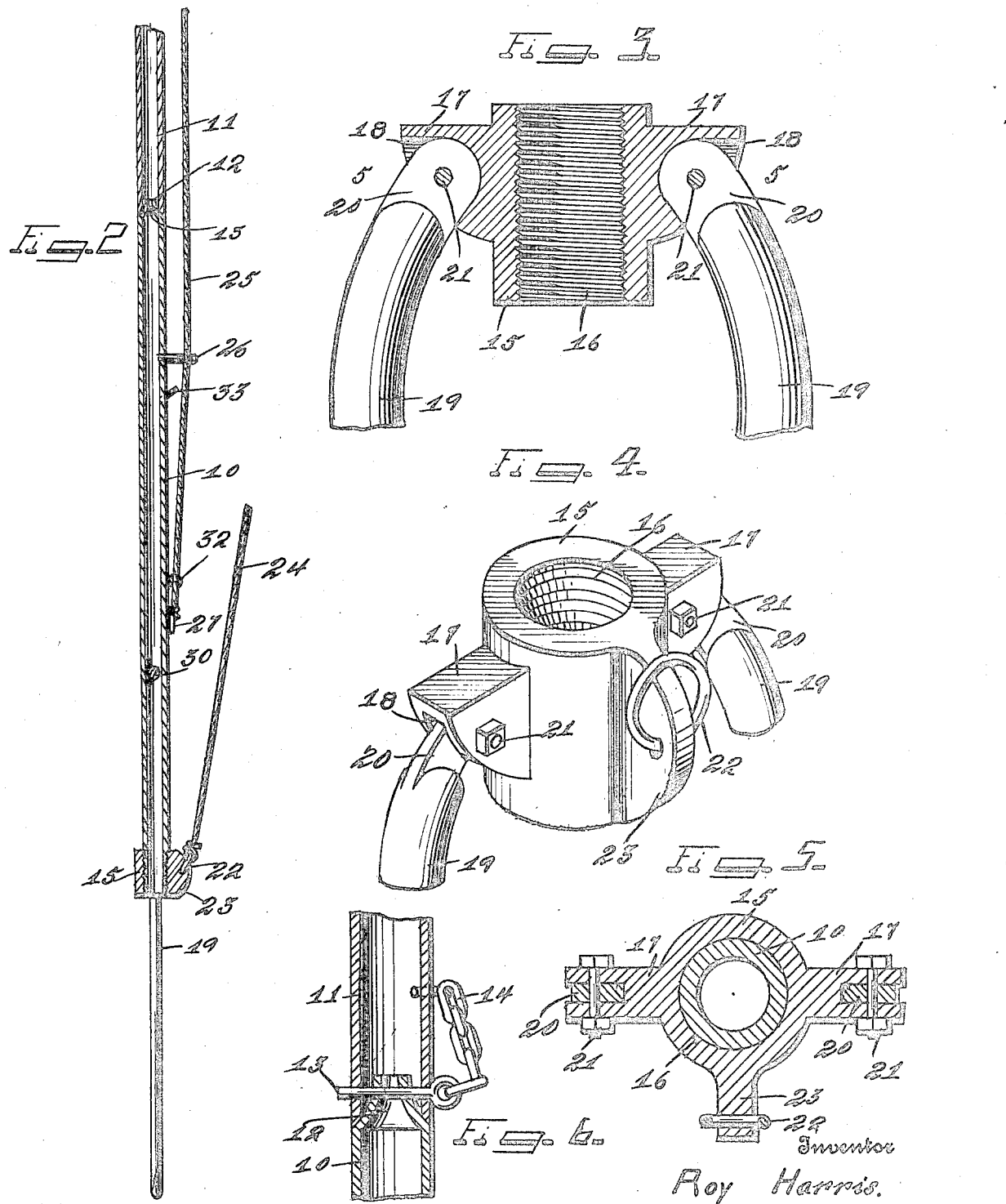

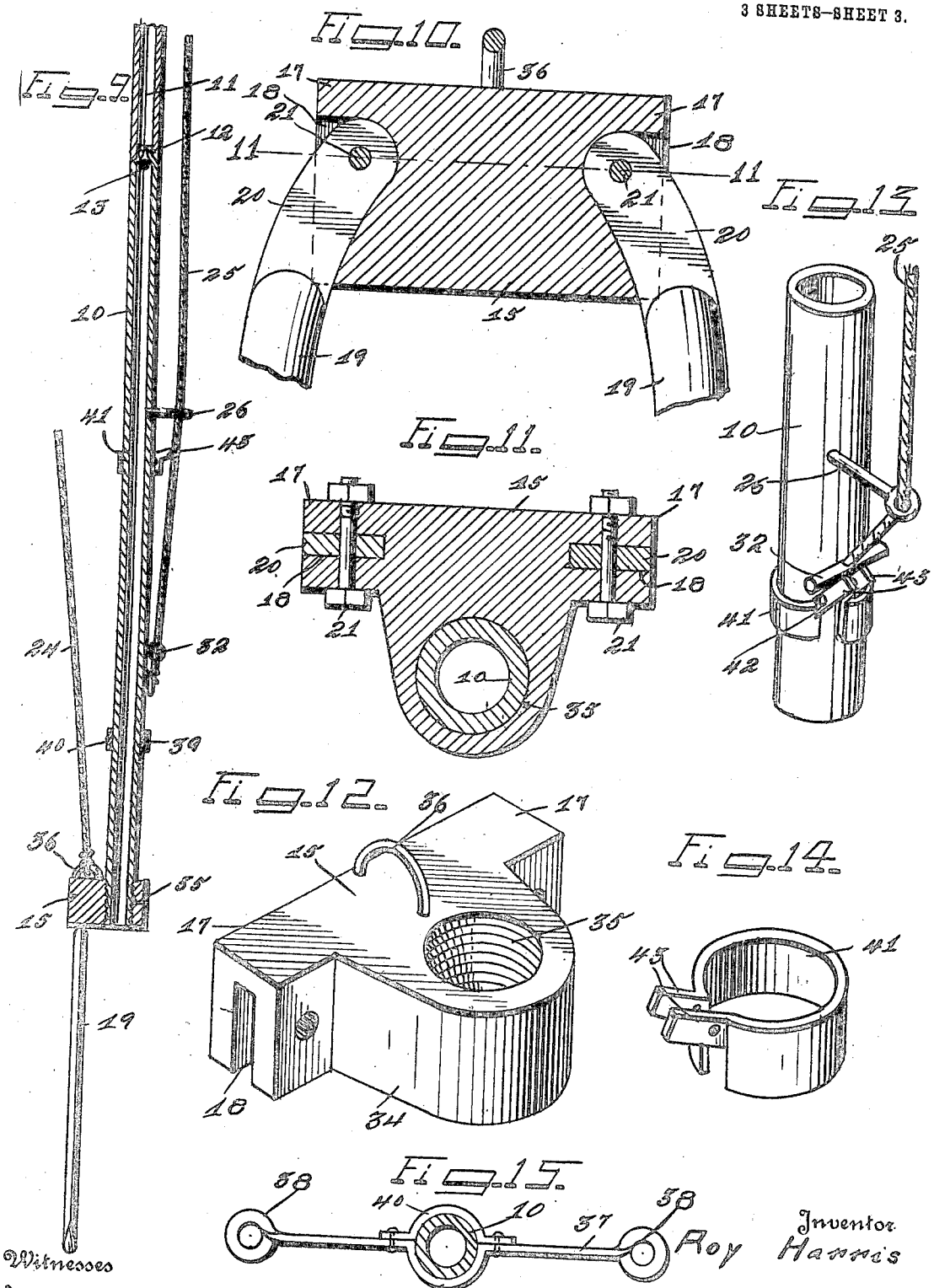

ROY HARRIS, OF WINCHESTER, IDAHO.

DEVICE FOR RAISING LOGS.

1,106,651.  Specification of Letters Patent.  Patented Aug. 11, 1914.

Application filed September 10, 1913. Serial No. 789,183.

*To all whom it may concern:*

Be it known that I, ROY HARRIS, a citizen of the United States of America, residing at Winchester, in the county of Lewis and State of Idaho, have invented certain new and useful Improvements in Devices for Raising Logs, of which the following is a specification, reference being had therein to the accompanying drawing.

This invention relates to a grapple, and the principal object of the invention is to provide an improved grapple which can be used for recovering logs which have become watersoaked and sunk to the bottom of a river or lake.

Another object of the invention is to provide the grapple with an improved means for operating the tongs which engages the sunken logs.

Another object of the invention is to provide the grapple with an improved means for guiding the line which raises the tongs and also provide means for holding the line in a raised position while lowering the grapple.

Still another object of the invention is to provide the grapple with an improved socket with which the tongs are pivotally connected, the socket being so formed that pivotal movement of the tongs will be limited.

This invention is illustrated in the accompanying drawings, wherein:

Figure 1 is a perspective view showing the grapple in use. Fig. 2 is a vertical sectional view through the grapple. Fig. 3 is an enlarged fragmentary view of the socket and upper portions of the tongs. Fig. 4 is a perspective view of the socket and broad portions of the tongs. Fig. 5 is a transverse section taken through the socket and upper portion of the tongs as shown in Fig. 3. Fig. 6 is a fragmentary sectional view through the standard of the grapple to show the manner in which the sections of the standard are removably connected together. Fig. 7 is a fragmentary perspective view of a section of the standard to show the manner in which the tong controlling line may be held in a raised position. Fig. 8 is a view showing the standard in cross-section and the guiding rod for the tong-operating lines in plan. Fig. 9 is a vertical sectional view through a log raiser provided with a slightly modified construction from that shown in Fig. 2. Fig. 10 is a vertical sectional view through the block shown in Fig. 12 with the tongs in position. Fig. 11 is a sectional view taken along the line 11—11, Fig. 10. Fig. 12 is a perspective view of the block used in the modified form of the invention. Fig. 13 is a fragmentary perspective view showing a modified manner of constructing the pins shown in Fig. 7. Fig. 14 is a perspective view of the collar shown in Fig. 13. Fig. 15 is a view similar to Fig. 8 and shows a modified manner of constructing the arms which guide the tong operating lines.

Referring to the drawings, it will be seen that the standard comprises a lower section 10 and upper sections 11. There may be as many of these upper sections 11 as desired, so that the standard will be of sufficient length to permit the grapple to reach the bottom of the river. The upper end of each of the sections is tapered, as shown at 12, in Fig. 6, and is provided with a transversely-extending opening which is positioned in alinement with an opening formed in the lower end of the adjoining section. A key 13 is passed through the alined openings of the two sections to removably connect the sections together, and is connected with the upper section by the chain 14, which chain prevents the key from becoming lost.

A socket 15, which is internally threaded, as shown at 16, is screwed upon the lower section 10 and is provided with side ears 17 which are provided with sockets 18 as shown in Fig. 3. The tongs 19 have their upper ends 20 reduced and flattened and pivotally mounted in the sockets 18 upon the pivot-pins 21. These sockets 18 are constructed as shown in Fig. 3, so that the tongs will be prevented from moving downwardly beyond a desired amount and also prevented from moving upwardly beyond the horizontal position indicated by the dotted lines in Fig. 1. A ring 22 is connected with a lip 23 and is provided so that a line or cable 24 can be connected with the standard adjacent its lower end, thus permitting the standard to be easily raised and lowered.

A line or light cable 25 extends through guiding eyes 26 carried by the standard and has its lower end connected with a ring 27 with which the upper ends of the lines 28 are connected. These lines 28 pass through the eyes 29 of the cross-rod 30 and have their lower ends connected with the eyes 31 of the tongs 19. By drawing the line 25 upwardly the tongs can be raised from the position shown in Fig. 1 to that indicated by the dotted lines, thus permitting the tongs to be held in an open position in order to permit them to more readily engage a short log. A short rod is carried by the line 25 between the eyes 26 and the ring 27 and forms an abutment which is intended to rest upon the pins 33 whenever it is desired to support the tongs in a raised position. This device permits the grapple to be easily operated since the tongs can be opened and then supported in the open position while the grapple is being lowered. It should be noted that the eyes 26 extend outwardly beyond the ends of the pins 33 so that when the grapple reaches the bottom of the river the line can be drawn upwardly and this will cause the abutment to be drawn from the ends of the pins. As soon as the line is released again, the abutment will pass the ends of the pins 33 and permit the tongs to lower.

The operation of this device is as follows: When it is desired to recover a log from the bottom of a river the tongs are raised and the grapple is then lowered above the logs. The sections 11 are connected with the lower section until a sufficient number are in place to permit the grapple to reach the bottom of the river and the line 25 is drawn upwardly to release the tongs and permit them to swing downwardly upon each side of the log. When the tongs have engaged the log, as shown in Fig. 1, the grapple 24 is drawn upwardly, thus raising the grapple and drawing the log to the surface of the river. As the grapple is raised the sections 11 are removed, thus permitting the grapple to be used conveniently. It should be noted that by having the tongs prevented from moving inwardly beyond a desired amount, there is no danger of the points on the tongs cutting into the logs a sufficient distance to cut entirely through the log and thus weaken the log to such an extent that the weight of the log will cause the points of the tongs to cut their way through, thus permitting the log to again sink to the bottom of the river.

The form shown in Fig. 9 is similar to that shown in Figs. 1 and 2, with the exception of the construction of the block 15, guiding rod 30 and supporting pins 33. The block 15, shown in Fig. 12, is provided with slots 18 in its end portions 17 to take the place of the pivot ears 17 shown in Fig. 4 and is provided with an extension 34 in which is formed the threaded opening 35. The eye 36 is located directly above the tongs 19 as shown in Fig. 9 and it will thus be seen that the tongs will be in alinement with the eye 36 instead of being in alinement with the standard 10, as shown in Fig. 2.

A metallic strip 37 has its end portions formed into the eyes 38 and has its central portion bent to form the yoke 39 which extends partially around the standard 10. A securing clamp 40 is secured to the strip 37 and extends about the remaining portion of the standard 10, as shown in Fig. 15, so that the strip 37 will be securely held in place. This strip 37 takes the place of the rod 30 and does away with the need of forming an opening in the standard. The coil 41 shown in Fig. 14 is placed about the standard beneath the eye-pin 26 and is held in place by a securing pin 42 extending through the inner ends of the tongs 43. These tongs 43 extend at an angle, as shown, and take the place of the pins 33. By use of this collar it is not necessary to form openings in the standard for the pins 33 and, therefore, the standard will not be weakened by having openings formed in it.

The construction and operation of the form shown in Fig. 9 is similar to that shown in Fig. 1 and, therefore, it is not necessary to describe the method of operating the form shown in Fig. 9.

What is claimed is:—

1. A grapple of the character described, comprising a standard, a socket at the lower end of said standard, pivot ears extending from said socket, tongs pivotally connected with said pivot ears, a guiding rod carried by said standard above said socket, lines connected with said tongs and passing through the outer ends of said guiding rod, a guiding eye carried by said standard, a line passing through said guiding eye and having its lower end connected with said first-mentioned lines, supporting pins carried by said standard beneath said guiding eye, and a support carried by said last-mentioned line adjacent its lower end and adapted to rest upon said supporting pins whereby said tongs may be supported in a raised position.

2. A grapple of the character described, comprising a standard, tongs pivotally connected with the lower end of said standard, a guiding rod carried by said standard, supporting pins carried by said standard, a line slidably connected with said standard, a support carried by said lines and adapted to rest upon said supporting pins, and lines connected with said first-mentioned line and passing through the ends of said guiding rod having their lower ends connected with said tongs whereby said tongs may be raised and held in a suspended position by the support of said first-mentioned lines resting upon said supporting pins.

3. A grapple comprising a standard, tongs pivotally connected with said standard, pins carried by said standard, a guiding eye carried by said support above said pins and extending beyond the ends of said pins, a line carried by said standard and passing through said guiding eye and having its lower ends connected with said tongs, and a support carried by said line and adapted to rest upon said pins to hold said tongs in an open position, said guiding eye extending beyond said pins whereby said support will be drawn free of said pins when said line is drawn upwardly, after said support has has been engaged by said pins.

4. A grapple of the character described comprising a standard, a block at the lower end of said standard, a shoulder extending from said block provided with a threaded opening in which the lower end of said standard fits, tongs pivotally connected with the ends of said block, a guiding strip carried by said standard, lines connected with said tongs and passed through the end portions of said guiding strip, an operating line connected with the upper ends of said first-mentioned lines, and a line connected with said block whereby said standard may be raised and lowered.

5. A grapple of the character described comprising a standard, tongs pivotally connected with the lower end portion of said standard, a strip secured to said standard and having its end portions formed into eyes, an operating line, and lines connected with said operating line and passed through the eyes of said strip and connected with said tongs.

In testimony whereof I hereunto affix my signature in presence of two witnesses.

ROY HARRIS.

Witnesses:
W. F. SEATZ,
P. F. SCANTLEBURY.